(12) United States Patent
Rog et al.

(10) Patent No.: US 6,690,323 B1
(45) Date of Patent: *Feb. 10, 2004

(54) GPS RECEIVER WITH EMERGENCY COMMUNICATION CHANNEL

(75) Inventors: Andrey L. Rog, Moscow (RU); Viktor I. Malashin, Saint-Petersburg (RU); Vladimir N. Ivanov, Saint-Petersburg (RU); Sergey B. Pisarev, Saint-Petersburg (RU); Denis G. Poverennyi, Saint-Petersburg (RU); Boris D. Fedotov, Saint-Petersburg (RU); Boris V. Shebshaevich, Saint-Petersburg (RU); Mikhail Y. Silin, Moscow (RU)

(73) Assignee: Samsung Electronics Co., Ltd., Gyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/720,902
(22) PCT Filed: May 25, 1999
(86) PCT No.: PCT/RU99/00173
§ 371 (c)(1), (2), (4) Date: Dec. 21, 2001
(87) PCT Pub. No.: WO00/72280
PCT Pub. Date: Nov. 30, 2000

(51) Int. Cl.$^7$ .......................... G01S 5/02; H04B 7/185
(52) U.S. Cl. .............................. 342/357.12; 342/357.1; 342/357.09; 701/213
(58) Field of Search ....................... 342/357.09, 357.1, 342/357.12; 701/213

(56) References Cited

U.S. PATENT DOCUMENTS 5,739,786 A * 4/1998 Greenspan et al.

* cited by examiner

Primary Examiner—Theodore M. Blum
(74) Attorney, Agent, or Firm—Sughrue Mion, PLLC

(57) ABSTRACT

The GPS-receiver with emergency communication channel, intended for message passing about emergency situations, containing the known design of the radio navigational receiver working in the GPS system, into which the unit of determination of deviation of a signal frequency of the base generator from a nominal value is in addition entered, whose first input is connected to an output of the base generator, the second input is connected by the signal bus to the appropriate output of the unit of transmission and reception of the messages on communication channel, and output—with means of data storage about deviation of a signal frequency of the base generator from a nominal value in the memory unit of the navigational processor for control of the signal processor and unit of correlation processing in searching for signals.

5 Claims, 3 Drawing Sheets

GPS RECEIVER WITH EMERGENCY COMMUNICATION CHANNEL

BACKGROUND OF THE INVENTION

1. Field of the Invention

The invention deals with the field of a radionavigation, and, in particular, relates to systems of personal safety indicating the position of an object on the basis of signals emitted by a satellite radio navigational system—GPS—and generating emergency message, containing positioning data, in an emergency situation.

2. Description of the Related Art

One of the important applications of a user equipment working on GPS signals is its use in systems of tracking of objects, including in systems of monitoring and in systems of personal safety.

The systems of tracking and monitoring of transport (see, for example, application of Germany (DE) 3501035, Int. Cl. 008 G 1/00, published Jul. 17, 1986 [1], application EPO (EP) 0379198, Int. Cl. 001 S 5/02, 001 S 5/14, published Jul. 25, 1990, [2], application EPO (EP) 0509775, Int. Cl. 001 S 5/14, published Apr. 15, 1992 [3], patent of U.S. Pat. No. 5,319,374, Int. Cl. 001 S 1/24, 001 S 5/02, 001 5 3/02, 004 C 11/02, published Jun. 7, 1994 [4]), in which the vehicle is supplied with the unit for a position-fix on GPS signals and radio communication unit to provide a link with a central station monitoring the position of a vehicle.

The systems are known, in which the location of a vehicles is determined on the basis of GPS signals and the location data are transmitted to a tracking station in case of an emergency situation (see, for example, application of Germany (DE) 3839959, Int. Cl. G08 B 25/00, G08 G 1/123, B60 Q 9/00, H04 Q 7/00, published Apr. 12, 1990, patent of USA (U.S. Pat. No. ) 5,355,140, Int. Cl. G01 S 1/08, G01 S 5/02, published Nov. 11, 1994, application PCT (WO) 93/16452, Int. Cl. 008 G 1/123, published Aug. 19, 1993 [7]).

In the above systems of tracking and monitoring vehicles [1–7] for a position-fix the standard receivers of GPS signals equipped with additional units, ensuring a data transmission about position, and also alarm signals to the monitoring station are used. As a rule, in such systems of GPS receivers there are no special requirements on a position-fix in conditions of partial blocking of a GPS signal reception and requirements dealing with miniaturization of the equipment.

On the other hand, unlike the vehicle positioning, the systems of personal safety might add supplementary requirements to GPS receivers operating for a position-fix. First, it deals with the preferential accommodation of the GPS receiver in a body of a radiophone, as for example in a system de-scribed in application EPO (EP) 0528090, Int. Cl. G01 S 5/00, published Feb. 24, 1993 [8]. It results in necessity to miniaturize the GPS receiver and to minimize power consumption. Second, there might be a requirement to provide a position-fix in conditions of interference of GPS signals, for example in operation conditions "under foliage".

The GPS receiver is known which is supplied with a communication channel for transmission/reception of messages generated in emergency situations (see application PCT (WO) 97/14057, Int. Cl. 001 S 5/14, G01 S 1/04, published Apr. 17, 1997 [9]), thus, solving the problem of object detection under conditions of interference of GPS signals. The receiver described in, is selected as the prototype. The generalized skeleton diagram of the receiver selected as the prototype, is shown in FIG. 1.

The prototype receiver, see FIG. 1, contains connected in series frequency converter 1 of GPS signals, unit 2 of analog-to-digital conversion of signals and channels switch 3. To the first output of the switch 3 are connected unit 4 for storage of samples of values of signals and, connected in series, signal processor 5. To the second output of the switch 3 the unit 6 of conventional correlation processing is connected. A heterodyne input of the radio frequency converter 1 and clock input of the unit 2 analog-to-digital conversions of signals, and also clock input of the unit 4 for storage of samples of values of signals and clock input of the unit 6 for correlation processing are connected to the appropriate outputs of the signal-former 7 for signals of clock and heterodyne frequencies supplied with means for formation of signals of clock and heterodyne frequencies, for example by synthesizers of frequencies.

The base input of the signal-former 7, comprising the base inputs of the appropriate synthesizers of frequencies, is connected to an output of the base generator 8. A control input of the signal-former 7, formed by the inputs of given initially set synthesizers of frequencies, control input of the switch 3, and also inputs—outputs of the data of the signal processor 5 and unit 6 for correlation processing are connected by the appropriate data buses to the navigational processor 9.

The navigational processor 9 is supplied with the unit 10 for storage of the programs and data. The peripheral equipment—unit 11 for input-outputs of the data and unit 12 for transmission and reception of the messages on communication channel also is connected to the navigational processor 9. The unit 11 is realized, for example, as a controller, keypad, or display and is supplied with the interface connector. The unit 12 is realized as the modem executing, for example, radio-frequency voice communication of the navigational processor 9 with the base station 13. The base station 13 is supplied with means for a signal reception of an alarm and location information of the receiver, and also means for self-formation of the ephemerical data, rough coordinate information on the position of the receiver, data of Doppler shift and means of transmission of these data through a radio channel to unit 12.

The prototype receiver—operates as follows. The GPS signals from an out-put of a receiving antenna go to an input of the radio frequency converter 1, where their conversion to a lower frequency takes place. Also used in this process are the mixers which are included in a structure of the converter 1, working with the heterodyne signals ($F_h$), coming from appropriate outputs of the signal-former 7. The signal-former 7 synthesizes signals of clock ($F_c$) and heterodyne ($F_h$) frequencies, using for this purpose a signal of a base frequency ($F_{base}$), coming from an output of the base generator 8. The initial setting of values of frequencies, generated by synthesizers, is effected by supplying appropriate initialization code from the navigational processor 9.

From an output of the radio frequency converter 1 signals go to an input of the unit 2 intended for analog-to-digital conversions of a signal, where they are converted to a digital kind. The sampling rate at analog-to-digital conversion is determined by a clock signal ($F_c$), coming from the appropriate output of the signal-former 7.

Later the signals go to an input of the switch 3 used for processing channels, which switching is effected by a control signal generated by the navigational processor 9.

In a usual mode the switch 3 executes hook up of an output of the unit 2 to an input of the unit 6 (correlation processor). The unit 6 together with the navigational processor 9 executes conventional correlation processing of received GPS signals at a 1 msec interval, including searching for signals on the basis of frequency and code, tracking, decoding, extraction of a service information about ephemerises, extraction of the navigational information (determination of radio navigational parameter—RNP). In particular, thus is achieved the determination of a temporal position of peaks of correlation functions of noise signals of visible satellites, which is used further by navigational processor 9 in calculations of position. The correlation processing in the unit 6 is implemented with a clock frequency determined by a clock signal ($F_c$), coming from an output of the signal-former 7.

The position information goes to the unit 11 (input-outputs of the data), where, for example, it is displayed on the screen.

The position information goes also to the unit 12, which in a communication session with a base station. 13 transmits to a base station the message about position and, in case of an emergency situation, the alarm signal, which is produced by means of the unit 11 and navigational processors 9.

At a base station 13 the formation of the ephemerical data, rough coordinate data of the receiver and data of Doppler shift takes place, independently from the activity of the receiver, which data goes through the communication channel to the unit 12 of the receiver. These data are used in the receiver operation under the adverse conditions of reception e.g. at a bad signal/noise ratio (at blockade of GPS signals).

In the adverse conditions of reception, i.e. at a bad signal/noise ratio, for ex-ample when the receiver is in a zone of blockade of GPS signals, the switch 3 connects an output of the unit 2 to an input of the unit 4 (storage of samples of values of signals).

The switching of the switch 3 is controlled by a signal shaped by the navigational processor 9, for example, by results of unsuccessful searching for signals with use of the unit 6, or on a signal of the operator, coming from the unit 11.

The unit 4 executes buffer storage of samples of values of signals shaped by the unit 2, at an interval of about 1 second. The record of samples in the unit 4 is implemented with a clock frequency determined by a clock signal ($F_c$), coming from an output of the signal-former 7.

Stored in the unit 4 samples of values of signals are used by the signal processor 5, which executes searches for signals and their correlation processing with the purposes of extraction of the navigational information (RNP). The data about RNP goes to the navigational processor 9, where the position-fix is being effected. Thus, for implementation of searching for signals, extraction of the navigational information and position-fix in the adverse conditions of a GPS signal reception, the signal processor 5 uses the ephemerical data, rough coordinate information on position and Doppler shift obtained by the navigational processor 9 on communication channel from a base station 13.

The position information determined in the navigational processor 9, goes to the unit 11 for indication, and also to the unit 12 for transmission to the base station 13 monitoring the receiver. Together with position information, the base station, if necessary, is provided with the messages on emergency situations, i.e. the alarm signals are transmitted which are shaped by means of the unit 11 and navigational processors 9 and are transmitted through the communication channel to the base station 13 by means of the unit 12.

Thus, prototype receiver provides a capability of detecting position and alarming both under the usual conditions of a GPS signal reception, and in conditions of their blockade.

One of the characteristic features of the prototype receiver, transmitting a message (alarm signals with a locating information) in emergency situations, is the necessity of fast searching for signals both under a usual conditions of a GPS signal reception, and in conditions of their blockade. The prototype receiver achieves this result by using a high-stability generator as the base generator 8, it is understood that the higher the stability of the base generator, the less time, under equal conditions, is required for tracing signals, both under the normal conditions of a GPS signal reception, and in conditions of their blockade.

However, this maintenance of high stability of the base generator is very labor-consuming, requiring application of special means, for example means thermo-stabilization (thermo-compensation). It makes the prototype receiver more complicated and expensive.

BRIEF SUMMARY OF THE INVENTION

The technical problem to be solved by the present invention is to equip the receiver by means, which allow to determine deviation of frequency of the base generator from a nominal value, using for this purpose an external high-stable base sine-wave signal received on a radio channel from a base station.

The achieved result provides capability for developing data about deviation of frequency of the base generator from a nominal value, which then are used at formation of the adjusting data of a carrier frequency in the navigational processor 9 for control of the signal processor 5 and unit 6 correlation processing when searching for signals. It allows to execute fast searching for signals at a position-fix both under normal conditions of a GPS signal reception, and in conditions of their blockade, thus use of simple base generators—simple, not compensated chips—is possible.

The invention provides a receiver of GPS signals with communication channel for message passing about emergency situations containing, in series, radio frequency converter of GPS signals, unit of analog-to-digital conversion of signals and switch of channel processing, to whose first output are connected joined in series, unit of storage of samples of values of signals and signal processor, and to whose second output are connected the unit of correlation processing. Signal processor and unit of correlation processing are connected with the navigational processor, which is supplied with memory unit for storage of the programs and data.

Heterodyne input of the radio frequency converter and clock inputs of the unit of analog-to-digital conversion of signals, of the unit of storage of samples of values of signals and unit of correlation processing are connected to the appropriate outputs of the former of signals of clock and heterodyne frequencies, which is supplied by means for formation of signals of clock and heterodyne frequencies—synthesizers of frequencies.

The base input of the former of signals of clock and heterodyne frequencies, which is formed by base inputs of the appropriate synthesizers of frequencies, is connected to an output of the base generator.

Control input of the former of signals of clock and heterodyne frequencies formed by inputs of given, initially set synthesizers, and control input of a communicator of processing are connected to the navigational processor, to which also are connected a data input-output unit and unit of transmission and reception of the messages through the communication channel linking the receiver to a base station.

Also added is the unit of determination of deviation of a signal frequency of the base generator from a nominal value. The first input of the unit is connected to an output of the base generator, the second input is connected by a data bus to the appropriate output of the unit of transmission and reception of the messages on communication channel, and output—is connected to means of data storage about deviation of a signal frequency of the base generator from a nominal value in the memory unit of the navigational processor connected with means of developing data of a carrier frequency in the navigational processor for control of the signal processor and unit of correlation processing by searching for signals.

BRIEF DESCRIPTION OF THE DRAWINGS

Essence of the stated invention—the capability of its implementation and industrial use—are illustrated by the drawings, presented in FIGS. 1 to 3, where.

1—radio frequency converter of GPS signals, 2—unit of analog-to-digital conversion of signals, 3—switch of channel processing, 4—unit of storage of samples of values of signals, 5—signal processor, 6—unit of conventional correlation processing, 7—former of signals of clock and heterodyne frequencies, 8—base generator, 9—navigational processor, 10—memory unit, 11—input-output unit of the data, 12—unit of transmission and reception of the messages, 13—base station, 14—unit of determination of deviation of a signal frequency of the base generator from a nominal value, 15—means for data storage about deviation of a signal frequency of the base generator from a nominal value, 16—means for developing data of a carrier frequency in the navigational processor.

Figure 3:
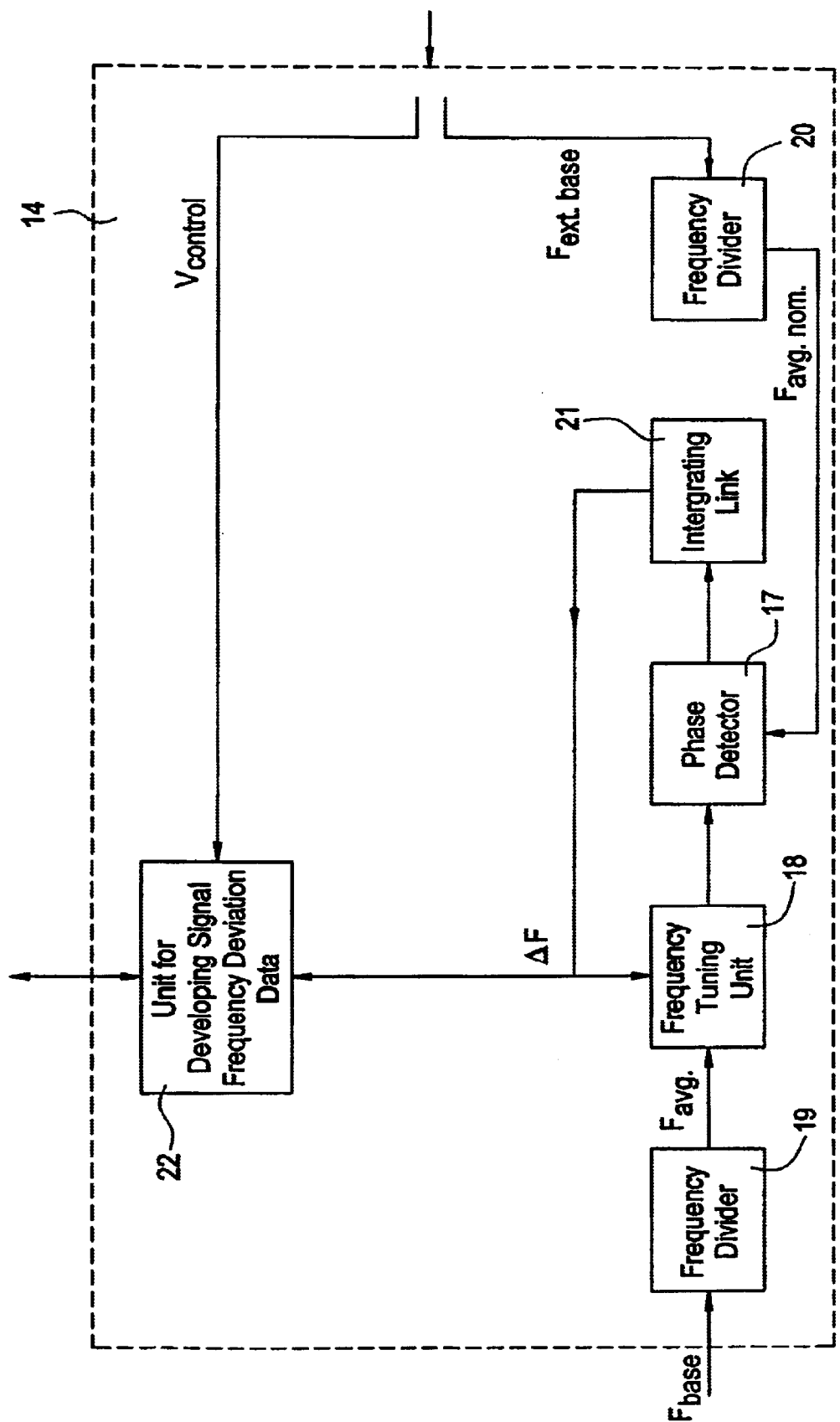

FIG. 3 is a block diagram of the unit of determination of deviation of a signal frequency of the base generator from a nominal value according to a preferred embodiment of the present invention, where: 17—phase detector, 18—frequency tuning unit, 19—first frequency divider, 20—second frequency divider, 21—integrating link, 22—unit for forming data about deviation of a signal frequency of the base generator from a nominal value.

DETAILED DESCRIPTION OF A PREFERRED EMBODIMENT OF THE INVENTION

A receiver according to a preferred embodiment of the invention has a unit for determining deviation of a signal frequency of the base generator from a nominal value, which includes the first frequency divider, whose output, through a tuning unit of frequency, is connected to the first input of a phase detector, whose second input is connected to an output of the second frequency divider, and the output, through an integrating link, is connected to a control input of a frequency tuning unit and to a signal input of a shaping unit for forming data about deviation of a signal frequency of the base generator from a nominal value. Thus, an input of the first frequency divider and output of a shaping unit for forming the data about deviation of a signal frequency of the base generator from a nominal value form accordingly first input and output of the unit of determination of deviation of a signal frequency of the base generator from a nominal value, and an input of the second frequency divider and control input of a shaping unit for forming data about deviation of a signal frequency of the base generator from a nominal value form the second input of the unit of determination of deviation of a signal frequency of the base generator from a nominal value.

Figure 1:
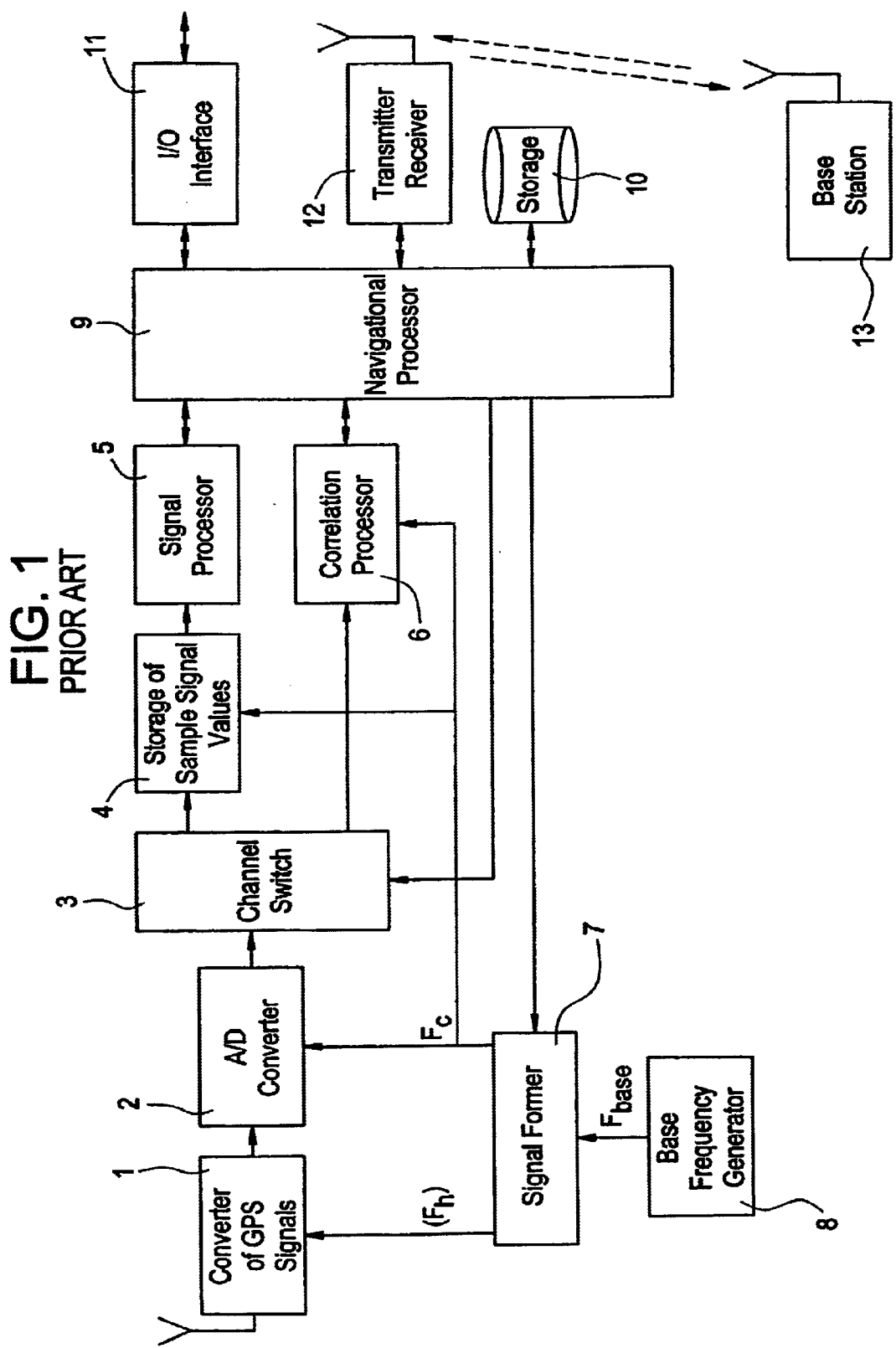
FIG. 1 is a generalized block diagram of a prototype receiver, where: 1—radio frequency converter of GPS signals, 2—unit of analog-to-digital conversion of signals, 3—switch of channel processing, 4—unit of storage of samples of values of signals, 5—signal processor, 6—unit of conventional correlation processing, 7—former of signals of clock and heterodyne frequencies, 8—base generator, 9—navigational processor, 10—memory unit, 11—input-output unit of the data, 12—unit of transmission and reception of the messages, 13—base station.
Figure 2:
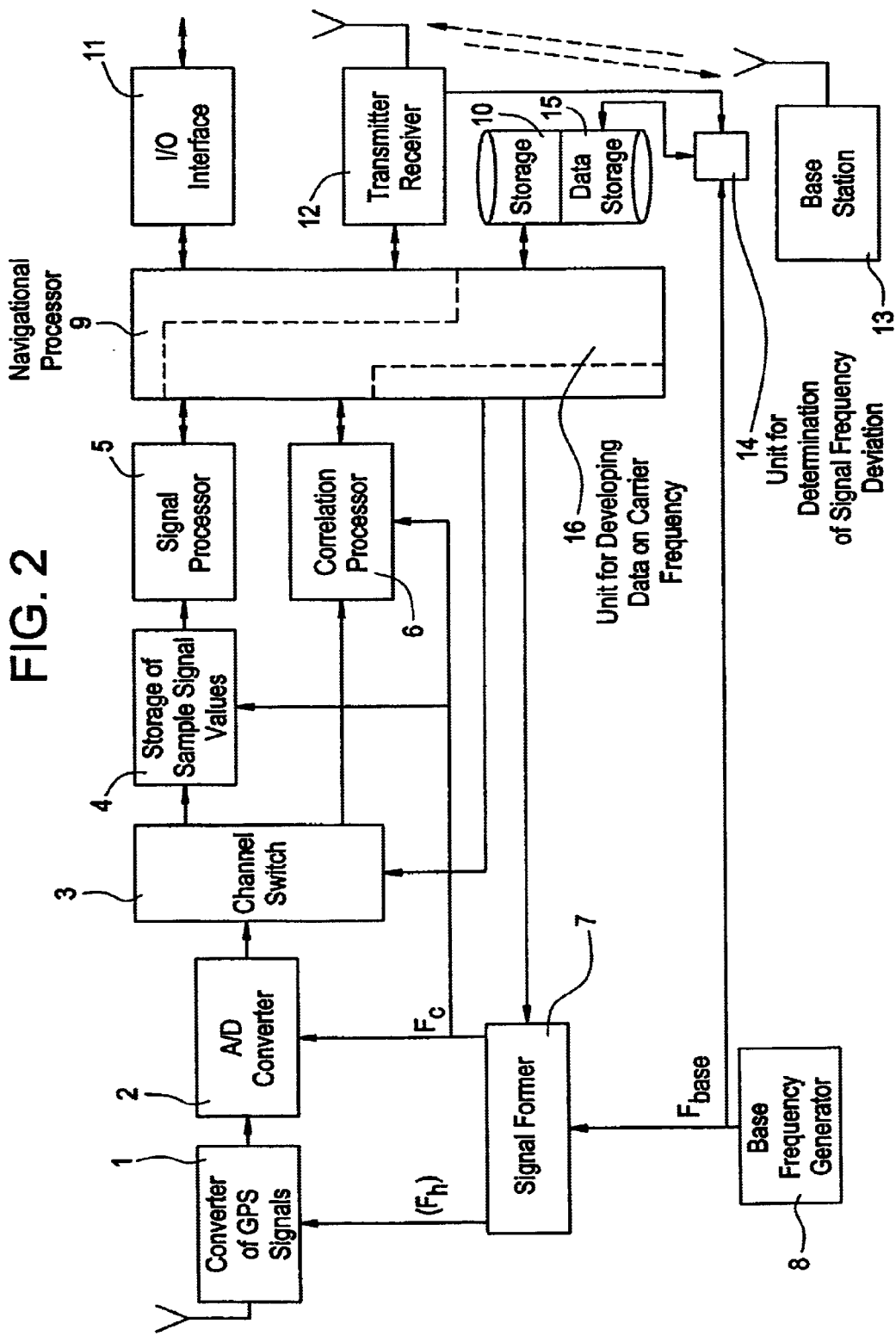
FIG. 2 is a block diagram of a receiver in accordance with the present invention, where.

According to the present invention, the receiver of GPS signals with communication channel for message passing about emergency situations (see FIGS. 2 and 3) contains serially connected radio frequency converter 1 of GPS signals, unit 2 dealing with analog-to-digital conversions of signals and switch 3 for channels of processing.

The unit 4 for storage of samples of values of signals and signal processor 5 are connected sequentially to the first output of the switch 3. The unit 6 for correlation processing is connected to the second output of the switch 3.

The signal former 7 for signals of clock and heterodyne frequencies is supplied with means for formation of signals of clock and heterodyne frequencies—synthesizers of frequencies (not shown in the drawings). The base input of the signal former 7, formed by base inputs of synthesizers of frequencies, is connected to an output of the base generator 8. The base generator 8 can be made on the basis of a simple, not compensated, chip.

The control input of the signal former 7, formed by inputs of the given, initially set synthesizers, is connected by the appropriate data bus. to the navigational processor 9. A control input of the switch 3, inputs—outputs of the data of the signal processor 5 and unit 6 for correlation processing also are connected by the appropriate data buses to the navigational processor 9.

The navigational processor 9 is supplied with the unit 10 for storage of the programs and data. The unit 11 for input-outputs of the data and the unit 12 for the transmission and reception of the messages on communication channel also are connected to the navigational processor 9 as the peripheral equipment. The unit 11 is realized, for example, as the controller, keypad, or the display and is supplied with the interface connector. The unit 12 is realized as the modem executing, for example, radio-frequency voice communication of the navigational processor 9 with a base station 13. The base station 13 is supplied with means for reception of the messages about emergency situations—alarm signals—and position information of the receiver, and also means for own formation of the ephemeral data, rough coordinate information on position of the receiver, data of Doppler shift and means for sending these data on a radio channel to the unit 12 on a highly-stable carrier frequency.

In the receiver according to the present invention, in contrast to the receiver of the prototype, there in provided as an additional element unit 14 for determinations of deviation of a signal frequency of the base generator 8 from a nominal value.

The first input of the unit 14 is connected to an output of the base generator 8, the second input of the unit 14 is connected by a signal bus to the appropriate output of the unit 12, and the output of the unit 14 is connected by the appropriate data bus to unit 15 for data storage about deviation of a signal frequency of the base generator 8 from a nominal value in the unit 10 for memories of the navigational processor 9. The unit 15, representing, for example, storage location of the register of the data, are connected to unit 16 for developing data on a carrier frequency in the navigational processor 9, intended for control of the signal processor 5 and unit 6 for correlation processing when searching for signals.

In an advantageous implementation as shown in FIG. 3, the unit 14 intended for determination of deviation of a signal frequency of the base generator 8 from a nomninal value includes a phase detector 17, whose first input is connected to an output of the unit 18 for tuning of frequency. Thus, the signal input of the unit 18 is connected to an output of the first frequency divider 19. The second input of a phase detector 17 is connected to an output of the second frequency divider 20, and the output of phase detector 17, through an integrating link 21, is connected to a control input of the unit 18 and signal input of the unit 22 for developing data about deviation of a signal frequency of the base generator from a nominal value.

The input of a frequency divider 19 forms the first input of the unit 14, the output of the unit 22 forms an output of the unit 14, and an input of a frequency divider 20 and control input of the unit 22 form the second input of the unit 14. The factor of division of a frequency divider 20 is equal to the ration of a nominal value of average frequency ($F_{avg.\ nom}$), based on the activity of a phase detector 17, to frequency of an external base signal ($F_{ext.\ base}$), coming from a base station 13 on communication channel through the unit 12.

The factor of division of a frequency divider 19 is equal to, for example, the ration of a nominal value of a given average frequency to a nominal value of a signal frequency shaped by the base generator 8.

The unit 18 for tuning of frequency can be realized, for example, as a divider (multiplier) of frequency with an adjustable factor of division. The unit 22 for developing data about deviation of a signal frequency of the base generator from a nominal value can be realized, for example, as the register of the data whose control input and output form respective control input and output of the unit 22. The integrating link 21 shapes at its output a digital signal obtained, for example, by analog-to-digital conversion of integrated signal of a phase detector 17. In case of an analog implementation of the unit 18, for example as the controlled phase switches, the integrating link 21 shapes at its output an analog signal, and structure of the unit 22 is actuated the appropriate A/D converter.

The receiver according to the preferred embodiment of the present invention operates as follows.

The receiver should be placed in a zone of assured radio communication with a base station 13. As a base station 13, for example, base station of a cellular telephone network can be used. In this case unit 12 represents the appropriate unit of transmission and reception of the messages in a radiophone. At a base station 13, the formation of the ephemeral data, data of the rough coordinate information on position of the receiver and data of Doppler shift are implemented. These data are transmitted to the unit 12 of the receiver on a highly-stable carrier frequency in established communication sessions.

The data of ephemerises, data ($F_{ext.\ base}$) of the rough coordinate information and data of Doppler shift received by the unit 12, are used by the receiver in adverse conditions of a GPS signal reception—at a bad signal to noise ratio, in conditions of blockade of GPS signals. The high-stable carrier frequency ($F_{ext.\ base}$), on which the said data are transmitted, is used in the receiver as an external reference frequency, in relation to which the deviation of a signal frequency of the base generator 8 from a nominal value is evaluated.

The position-fix is implemented in the receiver based on GPS signals. The GPS signals from an output of a receive antenna go to an input of the radio frequency converter 1, where their conversion with reduction of frequency takes place. Thus, the mixers, which are included in a structure of the converter 1, working on heterodyne signals ($F_h$), coming from the appropriate outputs of the signal former 7, are used.

The former 7 synthesizes signals of clock ($F_c$) and heterodyne ($F_h$) frequencies, using for this purpose a signal of a reference frequency ($F_{base}$), coming from an output of the base generator 8. The initial setting of values of frequencies, shaped by synthesizers, is implemented by supplying appropriate adjusting code from the navigational processor 9. Instability of a reference frequency $F_{base}$ and its excursion are reflected in deviation from nominal values of shaped heterodyne frequencies and, hence, in deviation from a nominal value of a signal frequency at an output of the radio frequency converter 1.

From an output of the radio frequency converter 1 signals go to an input of the unit 2 for analog-to-digital conversions of signals, where signals are converted to a digital kind. The discretization rate at analog-to-digital conversion is determined by a clock signal ($F_c$), coming from the appropriate output of the former 7. Further signals go to an input of the switch 3 (channels of processing), whose switching is governed by a control signal coming from the navigational processor 9.

In a usual mode (i.e. at a normal signal to noise ratio, in absence of blockade of GPS signals) the switch 3 connects an output of the unit 2 to an input of the unit 6 for correlation processing. The unit 6 together with the navigational processor 9 executes conventional correlation processing of adopted GPS signals on a 1 msec interval, including searching for signals by frequency and code, tracking, decoding, extraction from signals information about ephemerises, extraction of the navigational information (determination of radio navigational parameter—RNP). Thus, the determination of a temporal position of peaks of correlation functions of noise signals of visible satellites used by the navigational processor 9 in calculations of position is implemented.

The correlation processing in the unit 6 implements with a clock frequency determined by a clock signal ($F_c$), coming from an output of the former 7. Calculated by the processor 9 position information goes to the unit 11 (input-outputs of the data), where, for example, it is displayed on a screen. The position information goes also to the unit 12, which in a communication session with a base station 13 transmits to a base station the message about position and, if necessary, message on emergency situations—the alarm signals, which are shaped by means of the unit 11 and navigational processor 9.

In an adverse conditions of a GPS signal reception, for example, when the receiver is in a zone of blockade of GPS signals, when the signal/noise ratio is aggravated, the switch 3 connects the output of the unit 2 to an input of the unit 4 for storage of samples of values of signals. The switching of the switch 3 is based on a signal shaped by the navigational processor 9, for example, based on results of unsuccessful searching for signals with use of the unit 6, or based on a signal of the operator coming from the unit 11. The unit 4 executes buffer storage of samples of values of signals shaped by the unit 2, at an interval of about 1 second. The record of samples in the unit 4 is implemented with a clock frequency determined by a clock signal ($F_c$), coming from an output of the former 7.

Stored in the unit 4 samples of values of signals are used by the signal processor 5, which executes searching for signals and their correlation processing with the purposes of extraction of the navigational information (RNP). The data about RNP go to the navigational processor 9, where the position-fix takes place. Thus, for implementation of searching for signals, extraction of the navigational information and position-fix during adverse conditions of a GPS signal reception, the signal processor 5 uses the ephemerical data, rough coordinate information on position and Doppler shift obtained by the navigational processor 9 on communication channel from a base station 13. The position information determined in the navigational processor 9, goes to the unit 11 for indication, and also to the unit 12 for transmission to a base station 13, executing tracking of the receiver. Together with position information, to a base station, if necessary, the messages on emergency situations—alarm signals are transmitted which are shaped by means of the unit 11 and navigational processors 9 and are transmitted on communication channel to a base station 13 with the help of the unit 12.

A characteristic feature of the receiver according to the present invention(as well as of the prototype receiver), which allows position-fix and transmission of alarm information containing position data in emergency situations, is the necessity for fast searching for signals both in usual conditions of GPS signal reception, and in conditions of their blockage. The realization of fast searching for signals in the receiver according to the present invention is achieved by exact knowledge of real frequencies obtained as a result of conversion in the unit 1. The account of real frequencies is provided in the receiver by means of the unit 14, and also means 15, and 16 of navigational processors 9.

The functionality of these means is implemented as follows.

In the unit 12 the high-stable carrier signal ($F_{ext.\ base.}$) is selected, for example by a narrow-band filtration of signals coming from base station 13 through the communication channels. In the unit 12 an additional control signal $V_{control}$, which evidences the presence of a signal $F_{ext.\ base}$ of a certain level also is shaped. The formation of control signal $V_{control}$ can be implemented, for example, by detecting signal $F_{ext.\ base}$ and its comparison with a threshold value. The signals $F_{ext.\ base}$ and $V_{control}$ from the appropriate output of the unit 12 go via a signal bus to the second input of the unit 14.

In the unit 14, signal $V_{control}$ goes to a control input of the unit 22 (for developing data about deviation of a signal frequency of the base generator from a nominal value), namely to a control input of the register of the data which are included in a structure of the unit 22, permitting to record therein the data coming from an output of an integrating link 21.

The presence of a signal $V_{control}$ permits activity of the unit 14 only in presence of signal $F_{ext\ base}$, which eliminates formation of erroneous data (such as in conditions of absence of a signal $F_{ext.\ base}$) by unit 14. The highly-stable signal of frequency $F_{ext.\ base}$ goes to an input of a frequency divider 20, where it will be converted to a signal of frequency $F_{avg.\ nom.}$, corresponding to a frequency, on which the phase detector 17 operates.

The signal $F_{base}$ of the base generator 8, coming to the first input of the unit 14, will be converted to frequency $F_{avg.}$ in a frequency divider 19.

Generally, frequencies $F_{avg.\ nom.}$ and $F_{avg.}$ do not coincide. The difference between these frequencies, which characterizes the deviation of frequency $F_{base}$ of a signal of the base generator 8 from a nominal value, is determined by a circuit PLL of frequency formed by a phase detector 17, integrating link 21 and unit 18 for tuning of frequency.

The circuit operates as follows. Referring to FIG. 3, from an output of a frequency divider 19 the signal of frequency $F_{avg.}$ goes to a signal input of the unit 18 for tuning of frequency, which changes the frequency of a signal pursuant to a signal ($\Delta F$), coming to its control input from an output of an integrating link 21. The output signal of the unit 18 goes to the first input of a phase detector 17, where it is compared to a signal $F_{avg.\ nom.}$, coming to its second input from an output of a frequency divider 20.

The signal of misalignment from an output of a phase detector 17 goes to an input of an integrating link 21, shaping a control signal, which is proportional to a divergence of frequencies $F_{avg.}$ and $F_{avg.\ nom.}$. During the steady operation, value of the signal at an output of the unit 18 coincides in frequency and phase with a signal $F_{avg.\ nom.}$, at an output of a phase detector 17 misalignments are minimized, and the signal $\Delta F$ at an output of an integrating link 21 characterizes value and character of a divergence of frequencies $F_{avg.}$ and $F_{avg.\ nom.}$, i.e. characterizes deviation of a signal frequency of the base generator 8 from a nominal value.

The signal $\Delta F$, describing deviation of a signal frequency of the base generator 8 from a nominal value, is fixed (in view of a character) in the register of the data of the unit 22. From outputs of categories of the register of the data of the unit 22 transient data about value and character of deviation of a signal frequency of the base generator 8 from a rated value go to the memory unit 10, where their storage with the help of means 15 takes place.

The data, about deviation of a signal frequency of the base generator 8 from nominal values, stored in means 15, are used then by element 16 during formation of the adjusting data of a carrier frequency in the navigational processor 9 for operation control of the signal processor 5 and unit 6 for correlation processing when searching for signals. The fast searching for signals is thus provided by means of exact setting of carrier frequency in units 5 and 6 corresponding to actual frequency of signals obtained at an output of the radio frequency converter 1. Practically, the fast searching for signals at exact setting of frequencies can be implemented within the limits of one cycle of searching.

Thus, as follows from above-stated, the present invention is feasible, industrially applicable and solves a problem of providing the receiver with technical means allowing to determine deviation of a reference (base) frequency from a nominal value, using for this purpose an external high-stable reference (base) signal received on a radio channel from a base station. The achieved result, i.e. the capability of developing data about deviation of a reference frequency from a nominal value, is used in formation of the adjusting data of a carrier frequency in the navigational processor 9 for control of the signal processor 5 and unit 6 for correlation processing when searching for signals, that allows to execute fast searching for signals at a position-fix both under usual conditions of GPS signal reception, and in conditions of their blockage. Thus use of simple base generators—simple, not compensated ships—becomes possible. The said positive features make the present invention advantageous for use in systems of personal safety.

What is claimed is:

1. A GPS-receiver with emergency communication channel comprising:

a radio frequency converter of GPS signals;

an analog-to-digital signal converter;

a channel switch;

a first storage for storing samples of values of signals;

a signal processor;

a correlation processing unit;

a navigational processor including means for developing data on a carrier frequency for controlling the signal processor and the correlation processing unit;

an input/output interface;

a generator of signals of clock and heterodyne frequencies which includes synthesizers of frequencies;

a base frequency generator;

unit of transmission and reception of massages on a communication channel linking the receiver to a base station;

unit of determination of deviation of a signal frequency generated by the base generator from a nominal value; and a second storage for storing data representative of deviation of a signal frequency of the base generator from a nominal value, wherein:

said radio frequency converter of GPS signals, said analog-to-digital signal converter and said channel switch are connected in series;

the first storage and the signal processor are sequentially connected, to a first output of the channel switch are linked the sequentially connected first storage and signal processor, and to a second output of the channel switch is linked unit of the correlation processing unit;

the signal processor and the correlation processing unit are connected with the navigational processor;

a heterodyne input of the radio frequency converter and clock inputs of the analog-todigital signal converter, of the first storage and of the correlation processing unit are connected to the respective outputs of the generator of signals of clock and heterodyne frequencies;

a reference input of the generator of signals of clock and heterodyne frequencies, formed by reference inputs of the corresponding synthesizers of frequencies, is connected to an output of the base generator;

a control input of the generator of signals of clock signals and heterodyne frequencies, formed by inputs of initial settings of the corresponding synthesizers of frequencies, and a control input of the channel switch are connected to the navigational processor;

the input-output interface and the unit of transmission and reception of the messages on communication channel linking the receiver to a base station are connected to the navigational processor;

the unit of determination of deviation of the signal frequency of the base generator from the nominal value comprises:

a first input connected to an output of the base frequency generator, a second input connected by a signal bus to a corresponding output of the unit of transmission and reception of the messages on communication channel, and an output connected to the second storage, said second storage connected with the means for developing data on a carrier frequency in the navigational processor for controlling the signal processor and the correlation processing unit when searching for signals.

2. The receiver as claimed in claim 1, wherein the unit of determination of deviation of the signal frequency of the base generator from a nominal value comprises:

a first frequency divider;

a frequency tuning unit;

a phase detector;

an integrating link;

a second frequency detector; and a shaping unit for generating data indicative of the deviation of the signal frequency of the base generator from the nominal value, wherein:

an output of the first frequency divider is connected to a first input of the phase detector via the tuning frequency unit, a second input of the phase detector is connected to an output of the second frequency divider, an output of the phase detector is connected to a control input of the frequency tuning unit, via the integrating link, and to a signal input of the shaping unit, an input of the first frequency divider and an output of the shaping unit from the first input and the output of the unit of determination of the deviation of the signal frequency of the base generator from the nominal value, and an input of the second frequency divider and a control input of the shaping unit form the second input of the unit of determination of the deviation of the signal frequency of the base generator from the nominal value.

3. A GPS-receiver with emergency communication channel comprising:

a base frequency generator generating a signal for synchronizing signals of clock and heterodyne frequencies; and;

a unit for determining deviation of a frequency of the signal generated by the base frequency generator from a nominal value.

4. The GPC receiver as claimed in claim 3 further comprising a memory for storing data representative of the deviation of the signal frequency of the base frequency generator from the nominal value.

5. The GPC receiver as claimed in claim 4 further comprising means for adjusting signal processing of the GPS receiver in accordance with the data representative of the deviation of the signal frequency of the base frequency generator from the nominal value.

* * * * *